Nov. 2, 1965 K. HARTLEY 3,215,492
NUCLEAR FUEL PROCESSING
Filed March 4, 1963
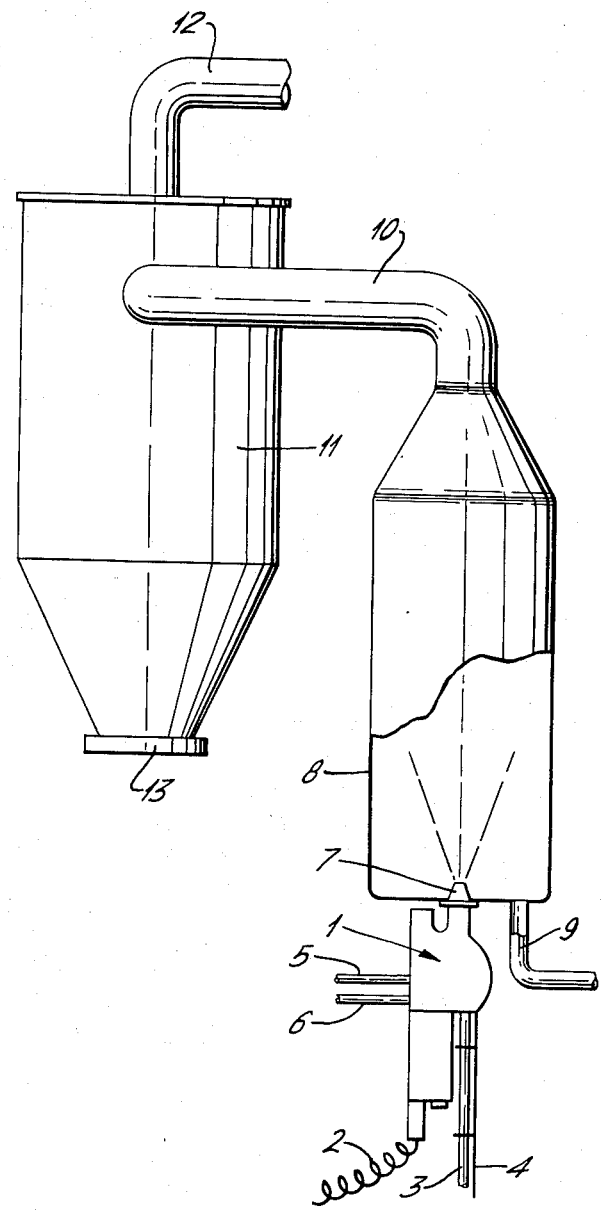

3,215,492
NUCLEAR FUEL PROCESSING
Kenneth Hartley, Thurso, Caithness, Scotland, assignor to United Kingdom Atomic Energy Authority, London, England
Filed Mar. 4, 1963, Ser. No. 262,704
Claims priority, application Great Britain, Mar. 8, 1962, 8,894/62
4 Claims. (Cl. 23—14.5)

The present invention relates to the processing of nuclear fuel materials for the recovery of the fissile material therefrom. More particularly, it concerns the recovery of unconsumed fissile material from irradiated nuclear fuel materials of the type where the fissile material is in ceramic form and is dispersed in a non-fissile matrix.

A common example of a metallic matrix is stainless steel; for example, so-called cermet fuel may have uranium dioxide, possibly mixed with plutonium dioxide, as a dispersion amounting to between 30 and 50% by volume in the stainless steel matrix. The type of wet processing route involving dissolution in nitric acid is not applicable to the bulk material because of the insolubility of stainless steel. Alternative wet processing routes which can effect dissolution of the stainless steel are apt to lead to large quantities of radioactive waste the disposal of which is a problem.

An object of the invention is to provide a method of separating the ceramic component from the non-fissile matrix in preparation for the further stages of a recovery process. In our British patent specification No. 841,860 there is disclosed a method of separating fissile oxide from a metallic matrix which comprises melting the metal in an inert atmosphere, maintaining the metal in a molten condition while a substantial amount of said oxide collects on the surface of the molten metal, and mechanically separating said oxide from said metal.

It is now proposed that in the recovery of fissile material from nuclear fuel material of the type where the fissile material in ceramic form is dispersed in a fusible non-fissile matrix, the ceramic component is separated from the matrix by a method which comprises heating the bulk fuel material at least locally in an inert atmosphere to a temperature higher than the melting point of the matrix under such conditions that material so heated is propelled away from the remaining bulk and, with simultaneous cooling, is broken up into particles. The factors of density difference and non-wetting of the ceramic component by the molten matrix act to better effect for separation purposes than in the method of the specification already referred to when the fuel material is broken down into small particles by the method now proposed. The product consists essentially of a mixture of matrix spheres of low ceramic component content together with the particles of the ceramic component.

A flow of inert gas suitably directed other than downwardly may be employed to establish a resultant propulsive force in a lateral or even upward direction, the inert gas flow then serving additionally for cooling of the detached particles. To this end a fluidised bed of the particles and the inert gas could advantageously be created. In addition or alternatively a laterally acting magnetic field may be utilised if the matrix is or contains a magnetic material; there is thus obtained a laterally acting component which is selective to matrix particles so that segregation of the two kinds of particles can be performed by reception in displaced receiving stations.

Localised heating of the bulk material is to be preferred to the alternative of heating the whole at once and then effecting a gradual discharge. Where the matrix is electrically conductive, localised heating is conveniently obtained by high frequency induction, alternatives being a reducing oxy-acetylene flame or plasma jet.

By way of example, the invention will be further described with reference to the accompanying drawing which shows diagrammatically an apparatus suitable for carrying it into effect by flame spraying.

In the drawing there is indicated at 1 a commercially available type of metal spray gun, such as is marketed by Metallisation Limited under the registered trademark "Metco." As is well known, this type of spray gun has feed wheels which are driven at an adjustable speed by an electric motor to feed forward into the gun the rod which is to be sprayed, the motor being supplied by the cable 2. In the present case, the rod is a fuel element 3 which is positioned by guiding structure 4, the fuel element being of (UPu)$O_2$/stainless steel cermet with a cladding of stainless steel still intact. Inlets 5 and 6 are respectively for the gases to supply the combustible mixture, namely acetylene and oxygen in the present example. The requisite reducing property of the flame implies an excess of acetylene. For forcing the molten material through a nozzle 7, there may be an additional supply to the gun of an inert gas to serve as an atomising carrier.

The nozzle 7 of the spray gun projects upwards into a spray chamber 8 adjacent an inlet 9 for the supply in a cooled condition of an inert fluidising gas, such as argon or possibly nitrogen, the width of the chamber being such that having regard to the angle of divergence of the spray and the lift of the fluidising gas the sprayed particles do not impinge in a soft state against the chamber walls. At a level sufficiently far above the nozzle 7 for the sprayed particles to be non-adherent on reaching it, the chamber converges into a pipe 10 which conducts the particles entrained in fluidising gas to a cyclone separator 11 having a gas outlet 12 for return of the fluidising gas and another outlet 13 for the discharge of the particles.

Upward orientation of the spray is to be preferred since when directed downwards it has been found that, possibly on account of weak bonding between the cladding and the fuel material of the element, quite large pieces of the fuel material can fall away without being disintegrated.

The primary application of the method herein proposed is in the recovery of unconsumed fissile material from irradiated nuclear fuel materials but it is also applicable where the fissile material is to be recovered from processing scrap. The particulate nature of the product of this method lends itself readily to batch and continuous leaching processes in which fissile oxide is dissolved in nitric acid in order to separate it from a metallic matrix of stainless steel which is not appreciably attacked by this reagent.

What I claim is:
1. As part of a process for the recovery of fissile material from nuclear fuel material of the type where fissile material in ceramic form is dispersed in a fusible non-fissile matrix, a method of separating the ceramic component from the matrix which comprises feeding the bulk fuel material to a flame sufficiently hot to melt the matrix, forcing the heated material through a nozzle so as to form a spray, entraining the spray of the heated material with a stream of cool inert gas, and conducting said stream to a station where particulate matter is separated from the gas.

2. A method according to claim 1, wherein the spray is directed upwardly for entrainment in the gas stream.

3. As part of a process for the recovery of fissile material from nuclear fuel material of the type where fissile material in ceramic form is dispersed in a fusible non-fissile matrix, a method of separating the ceramic component from the matrix which comprises feeding to a reducing oxy-acetylene flame a fuel element containing fuel material of said type with a metal cladding still intact thereon, forcing the heated material upwardly through a nozzle so as to form a spray, directing upwards for entrainment of the spray a stream of a cool inert gas, and con